March 1, 1960 A. V. LOUGHREN 2,927,151

COLOR-TELEVISION APPARATUS SIGNAL-MODIFYING SYSTEM

Filed July 24, 1952 3 Sheets-Sheet 1

*INVENTOR.*
ARTHUR V. LOUGHREN

BY Laurence B. Dodds

ATTORNEY

COLOR-TELEVISION APPARATUS SIGNAL-MODIFYING SYSTEM

Filed July 24, 1952 3 Sheets-Sheet 2

INVENTOR.
ARTHUR V. LOUGHREN
BY Laurence B. Dodds
ATTORNEY

March 1, 1960 A. V. LOUGHREN 2,927,151

COLOR-TELEVISION APPARATUS SIGNAL-MODIFYING SYSTEM

Filed July 24, 1952 3 Sheets-Sheet 3

INVENTOR.
ARTHUR V. LOUGHREN
BY Laurence B. Dodds
ATTORNEY

United States Patent Office 2,927,151

Patented Mar. 1, 1960

2,927,151

COLOR-TELEVISION APPARATUS SIGNAL-MODIFYING SYSTEM

Arthur V. Loughren, Great Neck, N.Y., assignor to Hazeltine Research, Inc., Chicago, Ill., a corporation of Illinois Application July 24, 1952, Serial No. 300,650

21 Claims. (Cl. 178—5.4)

GENERAL

The present invention is directed to signal-modifying systems for color-television apparatus utilizing a constant luminance type of television signal.

In a form of color-television system more completely described in an article in "Electronics" for February 1952, entitled "Principles of NTSC Compatible Color Television," at pages 88–95, inclusive, information representative of the color image being televised is utilized to develop at the transmitter two substantially simultaneous signals, one primarily representative of the luminance and the other representative of the chromaticity of the image. To develop the latter signals, the image to be televised is viewed by one or more cameras to develop color signals individually representative of such primary colors as green, red, and blue of the image and these signals are combined in a manner more fully described in the aforementioned article to develop a signal which primarily represents all of the luminance or brightness information relating to the televised image. Additionally, these color signals or components thereof are individually applied as modulation signals to a subcarrier wave signal devleoped at the transmitter effectively to modulate the latter signal at predetermined phase points thereof to develop the signal representative of the chromaticity of the image being televised. Conventionally, the modulated subcarrier wave signal or chromaticity signal has a predetermined frequency less than the highest video frequency, for example, a frequency of approximately 3.9 megacycles and has amplitude and phase characteristics related to the aforesaid primary colors of the televised image. In the specific form of such system, as described in the aforementioned article, the color signals are modified to become color-difference signals, in other words, to become signals such that when they are individually added in a receiver to the luminance signal, color signals will be developed. The color-difference signals are usually, but not necessarily, limited in band width to less than 2 megacycles. Effectively, signals which represent the color-difference signals are utilized to modulate the subcarrier wave signal at 0° and 90° phase points thereof and their intensities are so proportioned with respect to each other and with respect to the signal which primarily represents the luminance that they effectively relate only to the chromaticity information of the televised image and desirably do not include brightness or luminance information. The modulated subcarrier wave signal or chromaticity signal is combined with the luminance signal in an interleaved manner to form in a pass band common to both signals a resultant composite video-frequency signal which is transmitted in a conventional manner. Such a transmitted signal has been designated as a constant luminance type of television signal.

A receiver in such a television system intercepts the transmitted signal and initially derives therefrom the chromaticity signal and the luminance or brightness signal. The modulation components of the chromaticity signal, being the color-difference signals, are then detected by a deriving means which is designed to operate in synchronism and in proper phase relation with the subcarrier wave-signal modulating means at the transmitter. As discussed in the aforementioned article, these color-difference signals are effectively derived from the chromaticity signal by detecting quadrature-modulation components thereof. The derived color-difference signals desirably including only chromaticity information and the derived luminance signal are combined to devleop color signals individually representative of the green, red, and blue of the televised image. These color signals are then applied to an image-reproducing apparatus and are effectively combined to cause this apparatus to develop a color reproduction of the televised image.

As has been previously stated herein, in a constant luminance type of television signal, it is desired that the luminance signal determine the brightness of the reproduced color image and that the chromaticity signal contribute only to the color of the image while not affecting the brightness thereof. At the transmitter, the intensities of the components of the luminance and chromaticity signals are proportioned relative to each other to effect the last-mentioned result, in a system in which other than first order effects of the chromaticity signals on the luminance of a reproduced image are not considered bothersome, regardless of any extraneous noise or other undesired effects that may be developed in the channels through which the components of these signals are translated. The proportioning of the intensities of color-difference signals as components of the chromaticity signal is related to the relative luminosity contributions of the color-difference signals. For example, for a selected set of primary colors it is known that green has a brightness which is approximately twice that of red and over five times that of blue for a given exciting signal. In other words, a unit electrical signal applied to the channel through which the color-difference signal representative of green is being translated may be said to cause a unit brightness change in the reproduced image wheras a similar electrical signal in the channels through which the red and blue color-difference signals are translated, assuming equal gains in all of these channels, will cause, respectively, brightness changes of one-half and less than one-fifth of such unit brightness change in the reproduced image. In the aforedescribed system, to offset these differences in brightness effects at the receiver, the channel through which the color-difference signal representative of green is translated is proportioned to have a predetermined gain $\mu$, and the gains of the channels through which the red and blue color-difference signals are translated are then proportioned effectively to be $2\mu$ and approximately $5\mu$, respectively. It is apparent that as a result of such proportioning of the gains of the different channels a unit of electrical energy in the different color-difference channels will cause a unit of brightness change in each of the colors in the reproduced image. Because of the manner in which these colors happen to develop the reproduced image, the composite effect in the image of the brightness changes in each of the colors will be zero, the brightness change in each color being canceled by the brightness changes in the other colors.

The above-described arrangement for effecting cancellation of brightness changes caused by the chromaticity signal, specifically by the color-difference signals, operates satisfactorily for first order effects as long as over the normal range thereof the light emitted from the image screen of the image-reproducing apparatus is linearly related to the intensity of the electrical signals representative of the image and applied to the beam intensity control circuits of the image-reproducing apparatus. In practice, this linearity is not obtained, the light emitted over the aforementioned range varying as a power function $\gamma$ of the energy of the electrical signals applied to the image-reproducing apparatus. In order to offset this lack of linearity in the operation of the image-reproducing apparatus, it is conventional to utilize what is commonly known as gamma correction of the amplifiers at the transmitter to predistort either the intensities of the luminance or chromaticity signals or both so as to cause the different shades of light emitted from the reproduced image at the receiver to vary linearly over the aforesaid range. Thus, in one form of system to be considered more fully hereinafter, signals $E_y^{1/\gamma}$, $E_g^{1/\gamma}-E_y'$, $E_r^{1/\gamma}-E_y'$, and $E_b^{1/\gamma}-E_y'$ are effectively transmitted, where the symbol E represents voltage, the subscripts *y*, *g*, *r*, and *b* indicate the light parameter which the voltage represents, and $E_y'$ represents the sum of the $E_g^{1/\gamma}$, $E_r^{1/\gamma}$, and $E_b^{1/\gamma}$ terms proportioned in accordance with their relative luminosities. Due to this predistortion and thus nonlinearity of the luminance and chromaticity signals over the ranges of intensity thereof, the aforementioned arrangement for assuring that the chromaticity signal contributes only to the color of the image, since it is effective to correct only first order terms of the signals applied to the reproducing apparatus, is effective only over a fractional portion of the total range of intensities of such signals where such fractional portion is essentially linear. Second and higher order effects caused by the nonlinear signal-translating characteristic of the image-reproducing apparatus cause the chromaticity signal to affect the brightness of the image. Thus, in prior known television receivers, constant luminance is obtained for first order effects but not for second and higher order effects.

It is an object of the invention, therefore, to provide a new and improved signal-modifying system for a constant luminance type of color-television receiver which diminishes the undesired luminance effects developed in the image-reproducing systems of prior such receivers.

It is another object of the present invention to provide a new and improved signal-modifying system for a constant luminance type of color-television receiver in which the chromaticity signal applied to an image-reproducing system of the receiver contributes only to the color of the image and does not affect the brightness thereof to any substantial degree regardless of the nonlinearity of the response of the image-reproducing system to the brightness and chromaticity signals applied thereto.

It is a still further object of the present invention to provide a new and improved signal-modifying system for a constant luminance type of color-television receiver in which constant luminance correction is effected for first and higher order luminance effects of the color-difference signals utilized in such receiver.

It is a still further object of the invention to provide a signal-modifying system for color-television apparatus which is a part of a color-television system in which nonlinear signal reproducing apparatus is utilized and which diminishes the undesired luminance effects subsequently developed in the image-reproducing systems at the receiver of the color-television system.

In accordance with the present invention, there is provided a signal-modifying system for a color-television receiver including a color image-reproducing device having a nonlinear signal-translating characteristic tending to cause the luminance of an image reproduced by the device to differ from the luminance represented by a luminance signal applied thereto. The signal-modifying system comprises means including a first circuit for supplying a first signal primarily representative of the luminance of a color image and including a second circuit for supplying a second signal having modulation components primarily representative of the chromaticity of the color image. The signal-modifying system also includes means comprising a nonlinear signal-modifying apparatus effectively responsive to at least the modulation components of the second signal for developing therefrom a correction signal substantially representative of the difference between the luminance of an image reproduced by the device from the first and second signals and the luminance represented by the first signal. In addition, the signal-modifying system comprises means including a signal-translating system responsive to the first, second, and correction signals for applying the last-mentioned signals to the image-reproducing device to cause the luminance of an image reproduced thereby substantially to correspond to the luminance represented by the first signal.

For a better understanding of the present invention, together with other and further objects thereof, reference is had to the following description taken in connection with the accompanying drawings, and its scope will be pointed out in the appended claims.

Referring now to the drawings.

Figure 1:
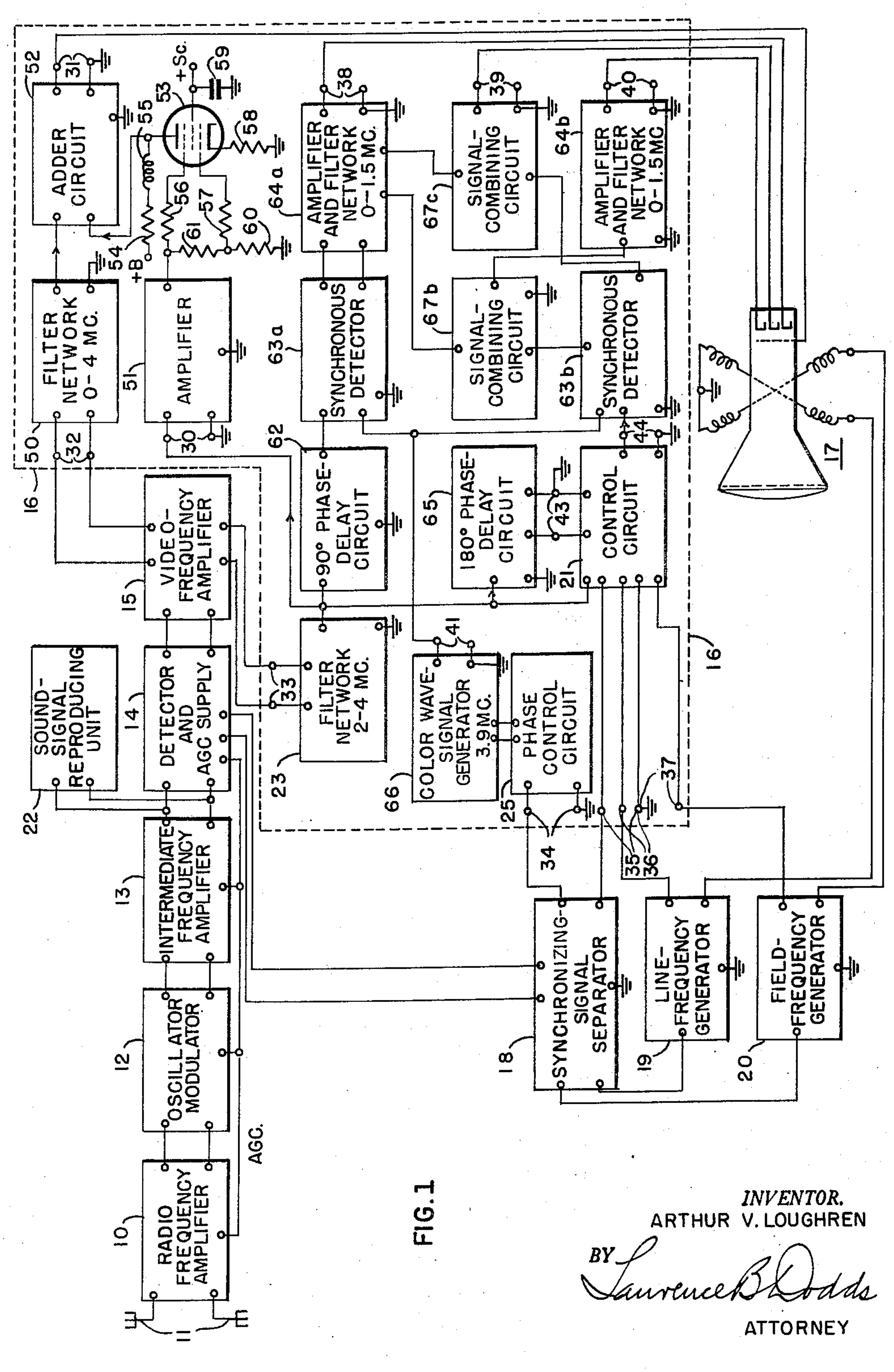
Fig. 1 is a schematic diagram representing a color-television receiver embodying a signal-modifying system in accordance with one form of the present invention.

*General description of receiver of Fig. 1*

Referring now to Fig. 1 of the drawings, there is represented a color-television receiver of the superheterodyne type such as may be utilized in a color-television system of the type previously discussed herein and more fully described in the aforesaid "Electronics" article. It is preferable, though not essential, that properly developed luminance and chromaticity signals which will be considered more fully hereinafter are utilized in such television system. The receiver includes a radio-frequency amplifier 10 of one or more stages having an input circuit coupled to an antenna system 11, 11. Coupled in cascade with the output circuit of the unit 10, in the order named, are an oscillator-modulator 12, an intermediate-frequency amplifier 13 of one or more stages, a detector and automatic-gain-control (AGC) supply 14, a video-frequency amplifier 15, a signal-modifying system 16 in accordance with the present invention, having a pair of input terminals 32, 32 and a pair of output terminals 31, 31 and to be considered more fully hereinafter, and an image-reproducing device 17. It is a characteristic of the device 17 that the luminance of the image reproduced therein undesirably tends to differ from the luminance represented by a brightness signal applied thereto if color is being reproduced by the device. This difference in luminance results from the nonlinear signal-translating characteristic of the device 17, in other words from the lack of a linear relationship between the intensity of the light developed on the image screen of the device 17 and the intensity of the electrical signals applied to the control electrodes of the device 17. The device 17 may, for example, comprise a single cathode-ray tube having a plurality of cathodes and a control electrode, different pairs of the cathodes and the control electrode being individually responsive to the different color signals, and including an arrangement for directing the beams emitted from the cathodes individually onto different phosphors for developing different primary colors. Such a tube is more fully described in an article entitled "General Description of Receivers for the Dot-Sequential Color Television System which Employ Direct-View Tri-Color Kinescopes" in the RCA Review for June 1950 at pages 228–232, inclusive. It should be understood that other suitable types of color-television image-reproducing devices may be employed.

An output circuit of the detector 14 is coupled through a synchronizing-signal separator 18 to a line-frequency generator 19 and a field-frequency generator 20, output circuits of the latter being coupled, respectively, to line-deflection and field-deflection windings of the image-reproducing device 17. Additional output circuits of the units 18, 19, and 20 are coupled, respectively, through pairs of terminals 35, 35, 36, 36, and 37, 37 to input circuits of a control circuit 21 in the signal-modifying system 16. An output circuit of the unit 18 is also coupled through a pair of terminals 34, 34 to a phase control circuit 25 in the unit 16 and to be considered more fully hereinafter. The (AGC) supply of the unit 14 is connected to input terminals of the units 10, 12, and 13 to control the gains of one or more of the stages therein to maintain the signal input to the detector 14 within a relatively narrow range for a wide range of received signal intensities. A sound-signal reproducing unit 22 is also connected to an output circuit of the amplifier 13 and may have stages of intermediate-frequency amplification, a sound-signal detector, stages of audio-frequency amplification, and a sound-reproducing device. An output circuit of the video-frequency amplifier 15 is coupled through a pair of terminals 33, 33 to a filter network 23 preferably having a 2–4 megacycle pass band. The unit 23 is a part of the signal-modifying system 16 and will be considered more fully hereinafter. The system 16 also includes a plurality of pairs of output terminals 38, 38, 39, 39, and 40, 40 individually coupled to different cathodes of the cathode-ray tube of the device 17. The system 16, as will be described more fully hereinafter, includes color-signal deriving apparatus comprising apparatus coupled between the pair of input terminals 32, 32 and output terminals 31, 31 for developing luminance signals and apparatus coupled between the pair of input terminals 33, 33 and the pairs of output terminals 38, 38, 39, 39, and 40, 40 for developing color-difference signals.

It will be understood that the various units thus far described, with the exception of the signal-modifying system 16, may be of any conventional construction and design, the details of such units being well known in the art and requiring no further description.

*General operation of receiver of Fig. 1*

In considering briefly the operation of the receiver of Fig. 1 as a whole, it will initially be assumed that the image-reproducing device 17 has a linear signal-translating characteristic and is one which combines a luminance signal and color-difference signals effectively to develop color signals, different ones of which control the intensities of different electron beams in the device 17 to effect, in cooperation with the scanning signals supplied thereto, a color-image reproduction of the televised image. It is assumed that the luminance signal and the color-difference signals are developed in the unit 16 in a conventional manner and that the device 17 operates in a substantially linear manner.

A desired composite television signal of the constant luminance type is intercepted by the antenna system 11, 11, is selected and amplified in the unit 10, and is converted to an intermediate-frequency signal in the unit 12, the latter signal being further amplified in the unit 13. The modulation components of the intermediate-frequency signal are derived in the unit 14 to develop a modulated subcarrier wave signal or chromaticity signal and a luminance or brightness signal which are translated through the amplifier 15. In the unit 16, color-difference signals are derived from the subcarrier wave signal and individually applied through different pairs of the terminals 38, 38, 39, 39, and 40, 40 to different cathodes of the image-reproducing device 17. The luminance signal is translated through the unit 16 and applied through the pair of terminals 31, 31 to the control electrode of the device 17. The luminance signal and each of the color-difference signals effectively combine to develop color signals individual ones of which control the intensities of different beams in the device 17.

The line-frequency and field-frequency synchronizing components of the video-frequency signal as well as a color burst signal for synchronizing the operation of the color-signal deriving apparatus in the unit 16 are separated from the video-frequency components and from each other in the unit 18. The color burst signal is applied through the terminals 34, 34 to the phase control circuit 25 in the unit 16 for the purpose of controlling the derivation of the color-difference signals in a manner more fully to be described hereinafter. The line-frequency and field-frequency synchronizing components are applied respectively to the units 19 and 20 to synchronize the operation thereof with the operation of related units at the transmitter. These generators supply signals of saw-tooth wave form which are properly synchronized with respect to the transmitted signal and are applied to the line-deflection and field-deflection windings in the device 17 to effect a scanning of the image screen in the device 17 in a sequence of vertically spaced horizontally extending lines by deflecting the cathode-ray beams therein in two directions normal to each other. The aforementioned intensity modulation of the cathode beams together with their alignment and their excitation of different color phosphors on the image screen of the device 17 are effective to cause a color image to be reproduced.

The automatic-gain-control or (AGC) signal developed in the unit 14 is effective to control the amplification of one or more of the stages in the units 10, 12, and 13 to maintain the signal input to the detector 14 and to the sound-signal reproducing unit 22 within a relatively narrow range for a wide range of received signal intensities. The sound-signal modulated wave signal having been selected and amplified in the units 10, 12, and 13 is applied to the sound-signal reproducing unit 22. Therein it is amplified and detected to derive the sound-signal modulation components which may be further amplified and then reproduced in the reproducing device of the unit 22.

*Description of signal-modifying system of Fig. 1*

The signal-modifying system 16 of Fig. 1 is designed to develop the luminance and color-difference signals from a composite video-frequency signal of a unique composition defined more fully hereinafter. Also, the unit 16 is designed to be coupled to an image-reproducing device having a nonlinear signal-translating characteristic. The system 16 comprises means including a first circuit for supplying a first signal $E_y^{1/\gamma}$ representative of the luminance of a color image and includes a second circuit for supplying a second signal. More specifically, the first circuit includes a filter network 50 preferably having a 0–4 megacycle pass band and having an input circuit coupled through the pair of terminals 32, 32 to an output circuit of the video-frequency amplifier 15, as previously described herein, and having an output circuit coupled to an adder circuit 52, to be considered more fully hereinafter.

The second circuit supplies a second signal, for example, a 3.9 megacycle modulated subcarrier wave signal having modulation components $E_g^{1/\gamma}-E_y'$, $E_r^{1/\gamma}-E_y'$, and $E_b^{1/\gamma}-E_y'$ primarily representative of the chromaticity of the color image being televised. Specifically, the second circuit comprises the 2–4 megacycle filter network 23 having its output circuit coupled, in cascade, in the order named, to a 90° phase-delay circuit 62, a synchronous detector 63a, and an amplifier 64a preferably having a 0–1.5 megacycle pass band. The output circuit of the unit 64a is coupled through the pair of terminals 38, 38 to a cathode circuit of the image-reproducing device 17. The second circuit also includes, in cascade with the output circuit of the network 23, the control circuit 21, a synchronous detector 63b, a signal-combining circuit 67b, and an amplifier 64b having a 0–1.5 megacycle pass band. The unit 67b is also coupled to an output circuit of the unit 64a and the output circuit of the amplifier 64b is coupled through the pair of terminals 40, 40 to another cathode circuit of the unit 17. As described in a copending application of Bernard D. Loughlin, Serial No. 159,212, entitled "Constant Luminance Color-Television System," filed May 1, 1950, now Patent No. 2,773,929, granted Dec. 11, 1956, the gains of the amplifiers 64a and 64b are adjusted in accordance with the relative luminosity effects of the color-difference signals to be translated therethrough. Thus, as described in the application last referred to, if the amplifier 64a translates the color-difference signal representative of blue while the amplifier 64b translates the color-difference signal representative of red, on the basis of unity gain for the channel through which the luminance signal is translated, that is, the channel including the unit 50, the gain of the unit 64b is adjusted to be +1.08 and the gain of the amplifier 64a is adjusted to be +2.03. The foundation for these gains will be considered more fully hereinafter. Additionally, the second circuit includes a 180° phase-delay circuit 65 coupled between the output circuit of the network 23 and an input circuit of the control circuit 21. Individual input circuits of the control circuit 21 are coupled through different pairs of terminals 35, 35, 36, 36, and 37, 37 to output circuits of the units 18, 19, and 20, respectively, as previously described herein. The details of the control circuit 21 and of the 180° phase-delay circuit 65 coupled thereto are more fully considered in a copending application of Bernard D. Loughlin, Serial No. 207,154, entitled "Color-Television System," filed January 22, 1951, now abandoned. In general, control circuit 21 is an electronic type of double-pole double-throw switch for causing signals applied thereto from the unit 23 to be translated to the input circuit of the detector 63b either without phase delay or through the unit 65 with a phase delay of 180°. As explained in the application last referred to, the purpose of such unit is to alternate the sequence in which the components are derived from the subcarrier wave signal at a predetermined rate. The synchronous detectors 63a and 63b are more fully described in the application last referred to and are essentially balanced modulators to which the modulated subcarrier wave signal and a locally generated signal of the same frequency as the subcarrier wave signal and having predetermined phase relations with respect thereto are applied to heterodyne and to derive the modulation components at the different phase points of the subcarrier wave signal.

The second circuit also comprises another signal-combining circuit 67c having input circuits coupled to the units 64a and 63b and an output circuit coupled through the pair of terminals 39, 39 to the third cathode circuit of the unit 17. The gain or, more accurately, the attenuation of the channel including the unit 67c is such as to cause the channel to translate −0.261 unit of the signal derived in the detector 63a and −0.552 unit of the signal derived in the detector 63b. The signal-combining circuits 67b and 67c are effectively adding circuits of a conventional type for adding predetermined portions of the signals translated through the units 64a and 63b, as defined by equations considered hereinafter, to develop output signals related thereto. Additionally, the second circuit comprises a color wave-signal generator 66 for developing the local signal previously referred to herein and having a frequency of 3.9 megacycles. The output circuit of the generator 66 is coupled through a pair of terminals 41, 41 to input circuits of the detectors 63a and 63b while an input circuit of the generator 66 is coupled through the phase control circuit 25 and a pair of terminals 34, 34 to an output circuit of the synchronizing-signal separator 18. The generator 66 may be of a conventional sine-wave developing type while the phase control circuit 25 may be a type of automatic phase control for utilizing a synchronizing signal, specifically the aforementioned color burst signal, applied thereto to control the phase of the signal developed in the generator 66.

The signal-modifying system also includes means comprising a non-linear signal-modifying apparatus responsive to at least the modulation components of the second signal, for example the modulation components of the subcarrier wave signal, for developing therefrom a correction signal substantially representative of the difference between the luminance of an image reproduced by the device 17 from the first and second signals and the luminance represented by the first signal. This non-linear signal-modifying apparatus comprises, in cascade, in the order mentioned, between the output circuit of the network 23 and an input circuit of the adder circuit 52, an amplifier 51 and an amplifier including a tube 53. The amplifier 51 has a predetermined signal-translating characteristic to be discussed more fully hereinafter with respect to the details of the correction signal to be developed by means of the units 51 and 53. More specifically, the gain of the unit 51 is proportioned to represent an averaged value of the denominator of the correction signal. The amplifier including the pentode tube 53 has a square-law signal-translating characteristic for effectively squaring the intensity of at least the modulation components of the subcarrier wave signal to develop the aforementioned correction signal. The pentode 53 is an element of a modulator having a pair of input circuits, for example, the inner and outer electrodes of the tube 53 connected, respectively, through parasitic suppression resistors 57 and 56 to different tap points on a voltage divider network comprising series-connected resistors 60 and 61 connected across the output circuit of the amplifier 51. The resistor 57 is connected to the junction of the resistors 60 and 61 while the resistor 56 is connected to the terminal of the resistor 61 remote from the junction of the resistors 60 and 61. The resistors 60 and 61 are proportioned to develop signals for application to the inner and outer control electrodes of the tube 53 which have substantially equivalent gain-control effects on the anode-cathode circuit of the tube 53. The cathode of the tube 53 is coupled to the negative terminal of a source +B through a biasing resistor 58 while the screen electrode of the tube 53 is connected to the positive terminal of a potential source +Sc and coupled through a condenser 59 to the negative terminal of the last-mentioned source. The anode of the tube 53 is connected through a series circuit of an inductor 55 and a resistor 54 to the positive terminal of the source +B and to the input circuit of the adder circuit 52. The anode circuit of the tube 53 is proportioned to translate low-frequency signals of the order of 0–1 megacycle without greater delay than that of a signal translated, for example, through the units 62, 63a, and 64a.

The signal-modifying system 16 also comprises means including a signal-translating system responsive to the first, second, and correction signals for applying the last-mentioned signals to the device 17 to cause the luminance of an image reproduced thereby substantially to correspond to the luminance represented by the first signal. More specifically, the signal-translating system comprises the adder circuit 52 coupled to the first circuit, that is, to the unit 50, and coupled to the signal-modifying apparatus, that is, to the output circuit of the tube 53, for developing from the first and correction signals a composite first signal for applying the composite first signal and the second signal to the device 17. The signal-translating system also includes the pair of terminals 31, 31 connected to the output circuit of the unit 52, the pairs of terminals 38, 38, 39, 39, and 40, 40 connected to the output circuits of the units 64a, 67c, and 64b, respectively, and the conductors connecting the four pairs of terminals just mentioned to the control electrode and cathodes of the image-reproducing device 17.

*Operation of signal-modifying system of Fig. 1*

Prior to considering the details of the improvement provided by the signal-modifying system 16 of Fig. 1, it will be helpful to consider generally the operation of the conventional elements in the unit 16, the problems prevalent in utilizing such conventional elements, and to consider generally a solution for such problems. In considering the operation of the unit 16, it is assumed that the brightness and color-difference signals have been gamma-corrected at the transmitter to complement the gamma of a nonlinear image-reproducing device such as the unit 17. With respect to the signal representative of luminance, it is conventional at the present time to translate a signal $E_y'$, as previously defined herein. However, the signal $E_y'$ has limitations when second and higher order luminance effects of the color-difference signals become important, as will be discussed hereinafter, and it is then preferable to transmit the signal $E_y^{1/\gamma}$ in order that no part of the luminance of the reproduced image is required to be translated through the channels for translating the color-difference signals. It is assumed at this point that the signal $E_y^{1/\gamma}$ is being transmitted, and that the units 51 and 53 operate to change the transmitted $E_y^{1/\gamma}$ signal to the $E_y'$ signal.

The video-frequency amplifier 15 applies a composite video-frequency signal including a first signal, representative of luminance, and a second signal, specifically a modulated subcarrier wave signal having modulation components primarily representative of the chromaticity of the image, to the input circuits of the units 50 and 23. Ignoring, for the moment, the details of operation of the adder circuit 52 and considering this circuit solely as a signal-translating means, the first signal or luminance signal comprising generally the 0–4 megacycle components of the video-frequency signal is translated through the network 50, the circuit 52, and the pair of terminals 31, 31 and applied to the intensity control-electrode circuit of the image-reproducing device 17. The modulated subcarrier wave signal having a mean frequency of 3.9 megacycles is translated through the 2–4 megacycle network 23, delayed in phase by 90° in the unit 62, and applied to an input circuit of the synchronous detector 63a. This subcarrier wave signal is also applied directly, that is, without appreciable phase delay, during one portion of the time, specifically, during predetermined fields, through the switch in the control circuit 21 to an input circuit of the detector 63b. During another portion of the time, specifically, during fields interleaved with the last-mentioned fields, the subcarrier wave signal is translated through the unit 65 with a phase delay of 180° and translated through the switch in the control circuit 21 for application to the input circuit of the synchronous detector 63b.

The synchronizing-signal components derived in the unit 18 include a signal conventionally designated as a color burst signal for synchronizing the operation of the 3.9 megacycle generator 66 with a corresponding generator for developing the subcarrier wave signal at the transmitter. This color burst signal is applied through the terminals 34, 34 to the phase control circuit 25 wherein the phase of the color burst signal and of the signal being developed in the generator 66 are compared and any phase difference is effective to develop a control signal for application to the generator 66 to control the phase of the signal developed therein. The synchronized sine-wave signal developed in the unit 66 is applied directly to input circuits in the detectors 63a and 63b. By heterodyning the locally developed 3.9 megacycle signal with the 3.9 megacycle subcarrier wave signal delayed in phase by 90°, the detector 63a is effective to derive the modulation components at a 90° phase point of the modulated subcarrier wave signal, these components in the system under consideration being representative of the blue of the image. As described in the aforementioned application, Serial No. 207,154, in a similar manner the detector 63b is effective to derive the modulation components representative of the red of the image. For reasons to be considered more fully hereinafter, the signal representative of red also includes some of the signal representative of blue. By controlling the operation of the switch in the control circuit 21 by means of the synchronizing signals applied thereto from the units 18, 19, and 20, as more fully described in the last-mentioned application, so that the modulated subcarrier wave signal is applied during one field to the detector 63b without appreciable phase delay, the latter components representative of red are derived during this one field of scan from a point on the subcarrier wave signal 90° in phase ahead of the point at which the components representative of blue are derived. More specifically, the components representative of red are derived during this one field of scan at a 0° phase point of the subcarrier wave signal. By causing the subcarrier wave signal to be translated through the 180° phase-delay circuit 65, the components representative of red are derived during the succeeding field from a point on the subcarrier wave signal lagging by 90° in phase that point at which the components representative of blue are derived. Thus, the phase sequence in which the color-signal components are derived on alternate fields is changed in synchronism with a similar sequence change at the transmitter generally for the purpose of diminishing the effect of phasing errors between the derivation of the modulation components at the receiver and the application of these modulation components to the subcarrier wave signal at the transmitter. The manner in which these effects are diminished is more fully considered in the aforementioned application, Serial No. 207,154.

The 0–1.5 megacycle portion of the blue color-signal components derived in the unit 63a is translated through the amplifier 64a with a gain of 2.03 with respect to the gain of the channel including the unit 50 and applied through the terminals 38, 38 to one of the cathode circuits of the unit 17. The 0–1.5 megacycle components representative of red are combined in the unit 67b with a predetermined portion of the signal representative of blue, this portion determined by equations to be considered hereinafter, to cancel the portion of the blue signal derived with the red signal in the unit 63b and the resultant signal solely representative of red is translated through the amplifier 64b with a gain of 1.08 and applied to another one of the cathode circuits in the unit 17. Portions of the components representative of blue and red, as defined by equations considered hereinafter, are applied respectively by the units 64a and 63b–b to the signal-combining circuit 67b. Portions of the signals derived in the units 64a and 63b are combined in the combining circuit 67c to develop a signal representative of the green color of the image in a manner more fully described in the aforementioned copending application, Serial No. 207,154. The signal representative of green is then applied through the terminals 39, 39 to the remaining cathode circuit of the unit 17.

As previously described, the color-difference signals applied to the cathodes of the cathode-ray tube and having intensities proportioned in terms of their relative luminosities combine with the brightness or luminance signal applied to the intensity control electrode of the unit 17 to control the intensity of the electron beams emitted from the different cathodes in accordance with the amplitude variations of the applied signals. Due to the relative proportioning of the color-difference components applied to the different cathodes of the unit 17, if the signal-translating characteristic of the unit 17 was linear, color-difference signals having amplitudes varying over their predetermined range of intensities would not affect the brightness of the image but would contribute only to the color of the image. The luminance or brightness signal applied to the intensity control electrode of the unit 17 in such a linear device would be effective to control the brightness of the image.

In other words, insofar as first order effects are concerned, the color-difference signals contribute only to the color while the brightness or luminance signal controls the brightness of the reproduced image. However, as has previously been mentioned herein, the image-reproducing device 17 has a nonlinear signal-translating characteristic $\gamma$ which tends to cause the luminance of the image reproduced by the device 17 to differ from the luminance represented by the luminance signal applied to the intensity control electrode thereof if color-difference signals are also being applied to the device 17. Since the luminance signal translated through the units 50 and 52 and applied to the intensity control electrode of the unit 17 is no longer the sole determining signal for the brightness of the image, the color-difference signals applied to the cathodes of the unit 17 also undesirably contribute to the brightness of the image. It is the purpose of the present invention to diminish the brightness effects caused by the color-difference signals applied to the cathodes of the unit 17, such effects being developed as a result of the nonlinear signal-translating characteristic of the unit 17.

Prior to considering the details of the operation of the unit 51 and the unit including the tube 53 to effect the last-mentioned purpose, it will be helpful to consider the theory upon which the design of the last-mentioned units is founded. An adequate consideration of such theory makes desirable a mathematical analysis of the composition of the error signal developed in the unit 17 by the color-difference signals applied thereto. The determination of the composition of such error signal then indicates the composition of such error signal then indicates the composition of the correction signal to be developed by the unit 51 and the unit including the tube 53.

Initially, it is desirable to consider the luminosity characteristic of the conventional subcarrier wave signal as described in the aforementioned "Electronics" article and of a subcarrier wave signal having a preferable luminosity characteristic. As has previously been stated herein, modulated subcarrier wave signals have quadrature-modulation components. These may be designated as $p'$ for the in-phase component and $q'$ for the quadrature component of the conventional subcarrier wave signal. If the locus of an arbitrary unit luminance error effect is plotted with respect to the range of composite color vectors definable by the vectors $p'$ and $q'$, it is found that an ellipse is defined having its major and minor axes at angles with respect to the $p'$ and $q'$ vectors. For reasons which will become more understandable hereinafter, it is preferable to have the in-phase and in-quadrature components of the subcarrier wave signal so proportioned as to define a locus for the arbitrary unit luminance which is substantially a circle centered at the vector center. With such a subcarrier wave signal, the luminance effect of any and all of the composite color signals has the same range of magnitudes regardless of the phase angle of the vector defining the composite color. Such a subcarrier wave signal simplifies the apparatus for developing a correction signal therefrom to correct for second and higher order luminance effects of the chromaticity signals. The luminance and chromaticity signals to be considered with reference to the units 51 and 53 are such as to satisfy the requirements for a circular luminance error locus. Hereinafter, with respect to Figs. 3 and 4, apparatus will be described for converting a subcarrier wave signal having the elliptical luminance locus to one having the desired circular luminance locus.

It may be assumed that the signals applied to a nonlinear image-reproducing system such as the unit 17 are the first or brightness signal $E_y'$ applied to the control electrode thereof and the color-difference signals $E_g^{1/\gamma}-E_y'$, $E_r^{1/\gamma}-E_y'$, and $E_b^{1/\gamma}-E_y'$ individually applied to different ones of the cathodes of the unit 17. The reasons for such signal compositions will become more apparent as the details of the signal-modifying system are discussed hereinafter. The signal $E_y'$ should determine the brightness of the image and the color-difference signals collectively should define the chromaticity and not affect the brightness of the image. If the nonlinearity of the unit 17 ocrresponds to the power term $\gamma$, the luminance L in lumens of an image developed on the display system may be expressed in terms of the luminance coefficients $1_g$, $1_r$, and $1_b$ defining the relative contributions to luminance of the different color signals G, R, and B raised to the $\gamma$ power where G, R, and B represent the potentials for developing, respectively, the green, red, and blue of the reproduced image. It is to be remembered that the color signals are the sum of the luminance and color-difference signals. Thus:

$$L=1_gG^\gamma+1_rR^\gamma+1_bB^\gamma \quad (1)$$

It is conventional to derive the color-difference signals $E_g^{1/\gamma}-E_y'$, $E_r^{1/\gamma}-E_y'$, and $E_b^{1/\gamma}-E_y'$ which for simplicity of expression may be represented, respectively, by $g$, $r$, and $b$ from a modulated subcarrier wave signal having, as previously mentioned, an in-phase modulation component $p$ and a quadrature-modulation component $q$, the derived color-difference signal $b$ being in phase with the modulation component $p$ while the derived color-difference signals $r$ and $g$ are at angles $\theta_r$ and $\theta_g$, respectively, with respect to the quadrature component $q$, in the system under consideration. If it is assumed that the derived color-difference signals $g$, $r$, and $b$ have relative intensities $a_g$, $a_r$, and $a_b$, respectively, then the color signals G, R, and B may be defined as follows in terms of the quadrature components $p$ and $q$ if the Y term representative of the luminance contributed by the $E_y^{1/\gamma}$ signal in each equation is indicated as a multiplier for the rest of the terms in the equation:

$$G=Y\left(1+\frac{a_g(-p)\sin\theta_g}{Y}+\frac{a_gq\cos\theta_g}{Y}\right) \quad (2)$$

$$R=Y\left(1+\frac{a_r(-p)\cos\theta_r}{Y}+\frac{a_r(-q)\sin\theta_r}{Y}\right) \quad (3)$$

$$B=Y\left(1+\frac{a_bp}{Y}\right) \quad (4)$$

If, for simplicity of computation, the sine and cosine terms of Equation 2 are represented, respectively, as $-A_g$ and $+B_g$, the cosine and sine terms of Equation 3 are represented, respectively, as $-A_r$ and $-B_r$ while the $p$ term of Equation 4 is represented as $+A_p$ and the G, R, and B signals are raised to the $\gamma$ power, the expressions of Equations 2, 3, and 4, by utilization of a binomial series expansion, become:

$$G^\gamma=Y^\gamma\left[1+\gamma(-A_g+B_g)+\frac{\gamma(\gamma-1)}{2}(A_g^2-2A_gB_g+B_g^2)+\ldots\right] \quad (5)$$

$$R^\gamma=Y^\gamma\left[1+\gamma(-A_r-B_r)+\frac{\gamma(\gamma-1)}{2}(A_r^2+2A_rB_r+B_r^2)+\ldots\right] \quad (6)$$

$$B^\gamma=Y^\gamma\left[1+(\gamma A_b)+\frac{\gamma(\gamma-1)}{2}(A_b^2)+\ldots\right] \quad (7)$$

Substituting the equivalent expressions for the terms $G^\gamma$, $R^\gamma$, and $B^\gamma$, as defined by Equations 5–7, inclusive, into Equation 1 and transferring the $Y^\gamma$ term to the left side of the resultant equation, if the bracketed terms represented as the coefficients of the terms $1_g$, $1_r$, and $1_b$ in the following equation represent the bracketed terms, respectively, of Equations 5–7, inclusive, the following resultant equation is obtained:

$$\frac{L}{Y^\gamma}=1_g\left[1+\gamma(-A_g+B_g)+\frac{\gamma(\gamma-1)}{2}(A_g^2-2A_gB_g+B_g^2)+\ldots\right]+1_r\left[1+\gamma(-A_r-B_r)+\frac{\gamma(\gamma-1)}{2}(A_r^2+2A_rB_r+B_r^2)+\ldots\right]+1_b\left[1+\gamma(A_b)+\frac{\gamma(\gamma-1)}{2}(A_b^2)+\ldots\right] \quad (8)$$

The latter expression represents the ratio of the actual luminance of the image developed in a nonlinear system such as the unit 17 to the luminance that should have been developed solely from the luminance signal. The difference between L and $Y^\gamma$ represents the luminance error contributed by the color-difference signals. At this point it should be understood that in a perfect constant luminance system L should equal $Y^\gamma$, that is, the color-difference signals should not affect the brightness of the reproduced image. If the color-difference signals do affect brightness, then $Y^\gamma$ should and does represent, in accordance with the present invention, not only the proper luminance contributed by the luminance signal $E_y^{1/\gamma}$ but also a luminance correction signal to compensate for the effects of the color-difference signals on luminance. In a constant luminance system such as described in the aforementioned application Serial No. 159,212, since such system is designed solely to provide luminance correction for a linear image-reproducing system, the first order terms of Equation 8 have values of zero. The relationship of the first order terms in Equation 8 may be expressed as follows:

$$\gamma 1_r(-A_r-B_r)+\gamma 1_b(A_b)+\gamma 1_g(-A_g+B_g)=0 \quad (9)$$

The reduction of the terms on the left side of Equation 9 to zero is accomplished by developing a proper relationship of the signal intensities of the color-difference signals *g*, *r*, and *b*. The gain factors for the color-difference signals *b*, *r*, and *g*, respectively, as previously mentioned, effect this result in conjunction with the phasing of the color-difference signals so that the luminance error contributed by each signal is effectively canceled by the errors of the other color-difference signals. The higher order terms in Equation 8 do not become zero but combine to cause some luminance effect in the reproduced image. In a constant luminance system, once the first order effects have been eliminated, the second order terms appear to have the maximum deleterious effect and, thus, should be made to cancel if a close approximation to constant luminance operation is to be obtained. Thus, if $\gamma$ is made equal to 2, the second order terms of Equation 8 should satisfy the following equation if, as considered above, the $Y^\gamma$ signal includes a compensating correction signal:

$$\frac{\gamma(\gamma-1)}{2}[1_r(A_r^2+2A_rB_r+B_r^2)+1_bA_b^2+1_g(A_g^2-2A_gB_g+B_g^2)]=0 \quad (10)$$

Replacing the A and B terms of Equation 10 with their equivalents, as previously expressed herein following Equation 4, and collecting the terms so as to have multiplier terms $$\frac{p^2}{Y^2},\ \frac{q^2}{Y^2},\ \text{and}\ \frac{2pq}{Y^2}$$

the following equation is obtained:

$$\frac{\gamma(\gamma-1)}{2}\left[\frac{p^2}{Y^2}(1_ra_r^2\cos^2\theta_r+1_ba_b^2+1_ga_g^2\sin^2\phi_g)+\frac{q^2}{Y^2}(1_ra_r^2\sin^2\theta_r+1_ga_g^2\cos^2\theta_g)+\frac{2pq}{Y^2}(1_ra_r^2\cos\theta_r\sin\theta_r-1_ga_g^2\cos\theta_g\sin\theta_g)\right]=0 \quad (11)$$

Equation 11 can be simplified if the term defining the cross product of *p* and *q* becomes zero when the signals *p* and *q* are derived from the subcarrier wave signal. In order for this to occur, the following relationship should exist:

$$1_ra_r^2\cos\theta_r\sin\theta_r-1_ga_g^2\cos\theta_g\sin\theta_g=0 \quad (12)$$

Equation 12 can be satisfied by having the two terms on the left side thereof equal to each other and, as will be explained more fully hereinafter, a subcarrier wave signal can be developed at the transmitter or at a receiver including the circuits described with reference to Figs. 3 or 4 to be so modulated by the components *p* and *q* representing the color-difference components *g*, *r*, and *b* that the angles $\theta_r$ and $\theta_g$ together with the signal magnitudes $a_r^2$ and $a_g^2$ considered in relation to the relative luminosities $1_r$ and $1_g$ of the colors red and green will develop a cross-product term of zero value.

If the cross-product term has zero value, the ratio of L to $Y^\gamma$ after rearranging the unity term previously inside the brackets then becomes:

$$\frac{L}{Y^\gamma}=1+\frac{p^2}{Y^2}(1_ra_r^2\cos^2\theta_r+1_ba_b^2+1_ga_g^2\sin^2\theta_g)+\frac{q^2}{Y^2}(1_ra_r^2\sin^2\theta_r+1_ga_g^2\cos^2\theta_g) \quad (13)$$

wherein the terms in the parentheses of Equation 13 correspond to the multiplier terms of $p^2$ and $q^2$ in Equation 11. In proportioning the modulated subcarrier wave signal at the transmitter in the manner described above, it is also possible to cause the *p* and *q* modulation components to have the same range of magnitudes. In other words, it is possible to develop the aforementioned modulated subcarrier wave signal having the circular luminance locus. In such case, all vectors on the modulated subcarrier wave signal will have the same range of magnitude and, consequently, the square of the intensity of the modulated subcarrier wave signal, since such intensity is effectively determined by the magnitudes of the modulation components *p* and *q*, effectively determines the sum of the two terms on the right side of Equation 13 ignoring for the moment the $Y^2$ terms. If the *p* and *q* terms have the same range of magnitudes, the $p^2$ and $q^2$ terms of Equation 13 become equal to each other.

Having determined the ratio of L to $Y^\gamma$ in lumens, a composite video-frequency signal including a suitable modulated subcarrier wave signal can be defined to cause the luminance error to approach zero. The correct luminance $Y^\gamma$, in terms of a potential, should be $(E_y^{1/\gamma})^\gamma$ or $E_y$. If the color-difference signals affect luminance, the luminance signal which should be applied to the image-reproducing device to compensate for the luminance error $L_e$ and to give the correct luminance may be designated $E_y'$ where $E_y^{1/\gamma}-E_y'$ is the electrical equivalent of the luminance error $L_e$. Thus, considering the signals $E_y^{1/\gamma}$ and $E_y'$ as having been translated through the device 17 with a response or $\gamma$:

$$\frac{L}{Y^\gamma}=\frac{E_y}{(E_y')^\gamma} \quad (14)$$

The equivalent of $$\frac{L}{Y^\gamma}$$

as defined by Equation 13, with $Y^2$ replaced by its equivalent $(E_y')^2$ may be substituted in Equation 14. Thus:

$$\frac{(E_y^{1/\gamma})^\gamma}{(E_y')^\gamma}=1+\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{(E_y')^2} \qquad (15)$$

By rearrangement of terms and bringing the $(E_y')^\gamma$ term to the numerator:

$$(E_y^{1/\gamma})^\gamma-(E_y')^\gamma=\frac{(E_y')^\gamma}{(E_y')^2}[p^2(1_ra_r^2\cos^2\theta_r+1_ba_b^2+1_ga_g^2\sin^2\phi_g)+q^2(1_ra_r^2\sin^2\theta_r+1_ga_g^2\cos^2\theta_g)] \qquad (16)$$

with $\gamma$ equal to 2, and collecting terms, Equation 16 becomes:

$$E_y^{1/\gamma}-{}'E=\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{E_y^{1/\gamma}+E_y'} \qquad (17)$$

Since the difference between $E_y^{1/\gamma}+E_y'$ and $2E_y^{1/\gamma}$ is small, Equation 17, for practical purposes becomes:

$$E_y^{1/\gamma}-E_y'=\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{2E_y^{1/\gamma}} \qquad (18)$$

Since $E_y^{1/\gamma}-E_y'$, as has been previously stated is the electrical equivalent of the luminance error, the right-hand term of Equation 18 defines the signal to be added to the transmitted $E_y^{1/\gamma}$ to provide the proper correction signal in the luminance channel to compensate for the luminance error caused by the second order terms of the color-difference signals. The term $$\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{2E_y^{1/\gamma}}$$

is obtainable by squaring the intensity of a modulated subcarrier wave signal after it is modified by being divided by a signal having the intensity $\sqrt{E_y^{1/\gamma}}$. Since a term $Z$ equal to the average value of $\sqrt{E_y^{1/\gamma}}$ will provide a reasonable denominator for many purposes, the gain of the amplifier 51 may be proportioned in a conventional manner to cause it to translate the signal represented by the numerator so that the intensity thereof is changed by a factor proportional to $1/Z$. One of the factors in determining the gain of the amplifier 51 is $1/Z$. Translating the modulated subcarrier wave signal through such amplifier will cause a signal $$\sqrt{\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{Z}}$$

to be developed in the output circuit thereof, this signal being effectively related to the intensity of the modulation components of the subcarrier wave signal since such components are effective to determine the intensity of the modulated subcarrier wave signal. Squaring the latter signal in the circuit including the tube 53 by causing the signals applied to the two control electrodes to be multiplied causes a resultant signal which corresponds to a signal $$\frac{p^2(1_ra_r^2\cos^2\theta_r+1_ba_b^2+1_ga_g^2\sin^2\theta_g)+q^2(1_ra_r^2\sin^2\theta_r+1_ga_g^2\cos^2\theta_g)}{E_y^{1/\gamma}}$$

to be developed in the anode circuit of the tube 53. As a result, the luminance signal $E_y'$ is developed in the output circuit of the unit 52 for application to the intensity control-electrode circuit of the device 17. In the unit 17, the correction component of the signal $E_y'$ inversely combines with the second order error signal developed by the color-difference signals *g*, *r*, and *b* and thus effectively cancels second order luminance effects of the signals *g*, *r*, and *b* in the reproduced image.

With respect to the subcarrier wave signal utilized to cause the *p* and *q* components to have equal intensities, it has been found by solution of the above equations for a given set of primaries that a subcarrier wave signal having the following *p* and *q* components will effect such result:

$$p=\frac{E_b^{1/\gamma}-E_y'}{2.03} \qquad (19)$$

and $$q=\frac{E_r^{1/\gamma}-E_y'}{1.08}+\frac{E_b^{1/\gamma}-E_y'}{8.44} \qquad (20)$$

The reason for the cross coupling in the unit 16 of Fig. 1 of the channels translating the color-difference signals representative of blue and red is apparent from Equation 20 since the *q* component which should represent only red includes some of the signal representative of blue. The need for the gains of 2.03 and 1.08 for the blue and red channels is also apparent.

The color signals $E_g$, $E_r$, and $E_b$ in a generalized form, in the system just described may have the following compositions for a selected set of primary colors:

$$E_g=E_y'-.261p-.552q \qquad (21)$$

$$E_r=E_y'-.261p+1.08q \qquad (22)$$

$$E_b=E_y'+2.03p \qquad (23)$$

In describing the signal-modifying system 16 of Fig. 1, it has been assumed that a $\gamma$ of 2 is sufficiently accurate to provide the desired correction for the higher order luminance effects of the color-difference signals *g*, *r*, and *b*. In practice, cathode-ray tubes of the three-gun type for reproducing color images have $\gamma$ of approximately 2.75. Experimentally it has been found that there is no significant difference between the solution employing a $\gamma$ of 2 and one employing a $\gamma$ of 2.75. Therefore, the above-described solution is correct for all practical purposes.

To summarize the above explanation, the nonlinear signal-modifying apparatus including the amplifier 51 and the modulator tube 53 responds at least to the modulation components of the second signal, that is, the modulated subcarrier wave signal to develop a correction signal such as defined by Equation 18. The modulation components $p$ and $q$ of the subcarrier wave signal determine the intensity thereof. The amplifier 51 has a gain representative of the term Z which is an averaged value of the square root of the denominator $2E_y^{1/\gamma}$ of Equation 18. The square root of the numerator of Equation 18, since the terms $$p^2(1_r a_r^2 \cos^2 \theta_r + 1_b a_b^2 + 1_g a_g^2 \sin^2 \theta_g)$$

and $q^2(1_r a_r^2 \sin^2 \theta_r + 1_g a_g^2 \cos^2 \theta_g)$ are equal to each other, is defined by the intensity of the subcarrier wave signal applied to the amplifier 51. A signal is developed in the output circuit of the unit 51 and squared in the circuit including the tube 53 to become the correction signal defined by Equation 18. This signal when algebraically added to the signal $E_y^{1/\gamma}$ in the unit 52 becomes the corrected luminance signal $E_y$.

Figures 2, 4, 5:
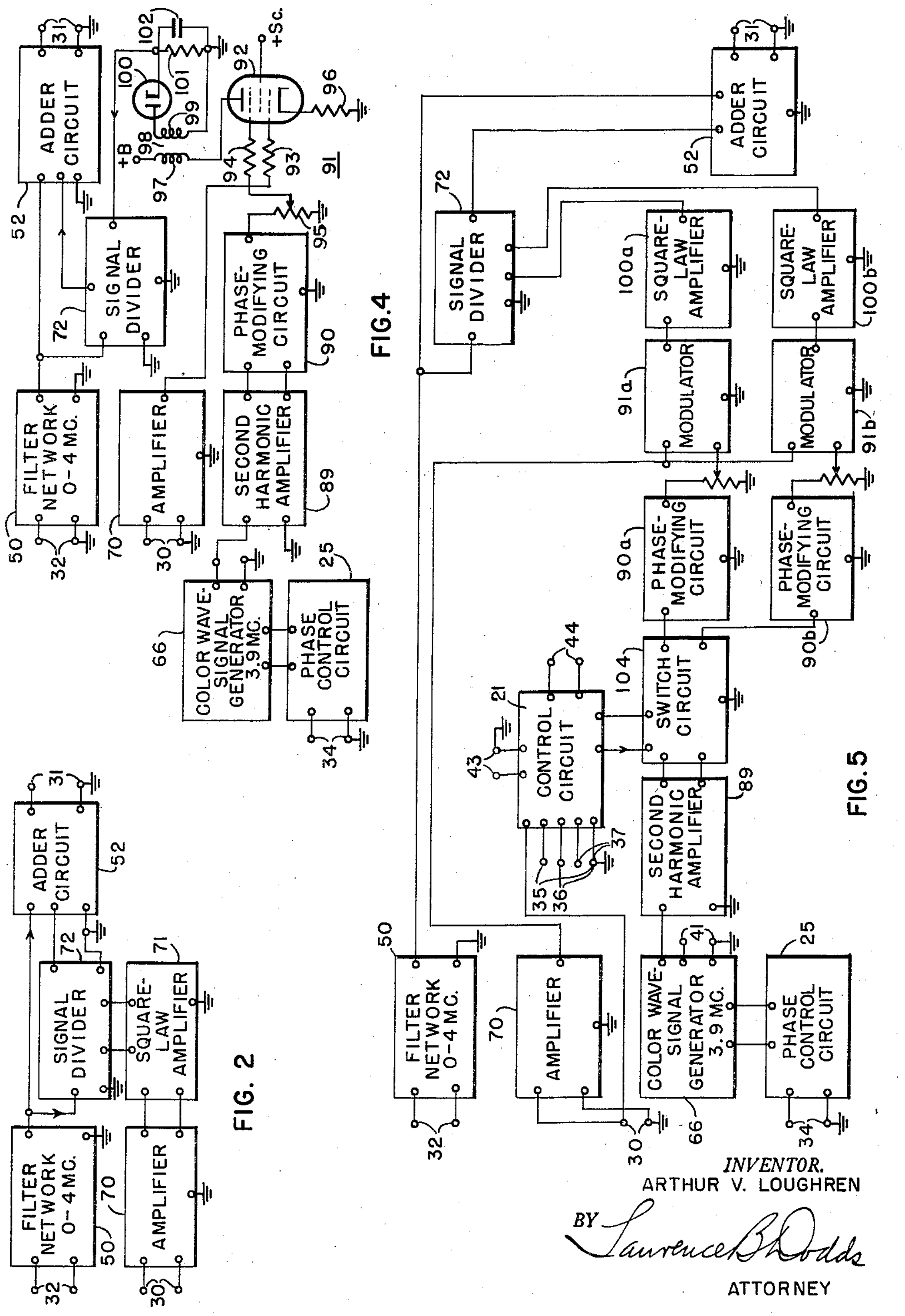
Fig. 2 is a schematic diagram of a modified form of a portion of the signal-modifying system of Fig. 1.
Fig. 4 is a circuit diagram, partly schematic, representing another modified form of a portion of the signal-modifying system of Fig. 1.
Fig. 5 is a schematic diagram of a modified form of the portion of the signal-modifying system represented by Fig. 4.

*Description and explanation of operation of portion of signal-modifying system of Fig. 2*

It has been explained with reference to the signal-modifying system of Fig. 1 that the error signal includes a denominator term $E_y^{1/\gamma}$ representative of the luminance signal translated through the filter network 50 of Fig. 1. In the embodiment of Fig. 1 it was explained that this denominator term may effectively be represented for normal operating conditions by causing the gain of the amplifier 51 of Fig. 1 to be inversely related to a term Z representing the average value of $\sqrt{E_y^{1/\gamma}}$. It may be desired to utilize a signal which more accurately represents the luminance signal. The portion of the signal-modifying system represented by Fig. 2 includes a circuit arrangement for utilizing the brightness signal $E_y^{1/\gamma}$ for this purpose. The units of Fig. 2 corresponding to units of Fig. 1 are identified by the same reference numerals as in Fig. 1 and the pairs of terminals 30, 30, 31, 31, and 32, 32 correspond to the similarly numbered terminals in Fig. 1.

The amplifier 70 of Fig. 2 is similar to the amplifier 51 of Fig. 1 except that the signal-translating characteristic thereof is conventional and not proportioned to represent Z. The square-law amplifier 71 which may be considered to be a second nonlinear repeater coupled to the second circuit through the amplifier 70 may be of a type such as the square-law modulator including the tube 53 of Fig. 1 or any other type of square-law repeater circuit. Additionally, Fig. 2 includes a first nonlinear repeater coupled to the second circuit, specifically, a signal divider 72 having separate input circuits coupled to the output circuit of the network 50 and the output circuit of the amplifier 71 and having an output circuit coupled to an input circuit of the adder circuit 52. The divider circuit 72 may be of a type more fully described in a copending application Serial No. 262,308 of Donald Richman with reference to Fig. 2*a* thereof. Essentially, such circuit may consist of a multielectrode vacuum tube having a pair of control electrodes and, preferably, of the remote cutoff type. In such tube, the $e_g - i_p$ curve of the remote cutoff grid over a selected portion thereof closely approximates a hyperbola, that is, a curve in which one coordinate varies as the negative reciprocal of the other thus representing a negative inverse function. Therefore, if a signal is applied to the remote cutoff grid, there is developed on the anode of the tube a negative inverse reproduction of the applied signal. Since a conventional modulator normally produces an output proportional to the product of the applied signals, if a negative signal is applied to the remote cutoff grid of the tube, the operation of the tube is such that the resultant signal developed across the anode load resistor represents the division of the signal applied to the inner control electrode of the tube by the signal applied to the remote cutoff grid. Consequently, if the $2E^{1/\gamma}$ signal is applied to the remote cut off grid in the signal divider 72 and a signal the intensity of which is the square of the intensity of the modulated subcarrier wave signal is applied from the amplifier 71 to the inner control electrode of such tube, the signal developed in the output circuit of the divider 72 represents the square of the subcarrier wave signal divided by $2E_y^{1/\gamma}$ or $$\frac{p^2(1_r a_r^2 \cos^2 \theta_r + 1_b a_b^2 + 1_g a_g^2 \sin^2 \theta_g) + q^2(1_r a_r^2 \sin^2 \theta_r + 1_g a_g^2 \cos^2 \theta_g)}{2E_y^{1/\gamma}}$$

This signal is then applied to the adder circuit 52. The correction signal which compensates for the luminance error contributed by the color-difference signals and defined by Equation 18 is thus substantially developed.

Figure 3:
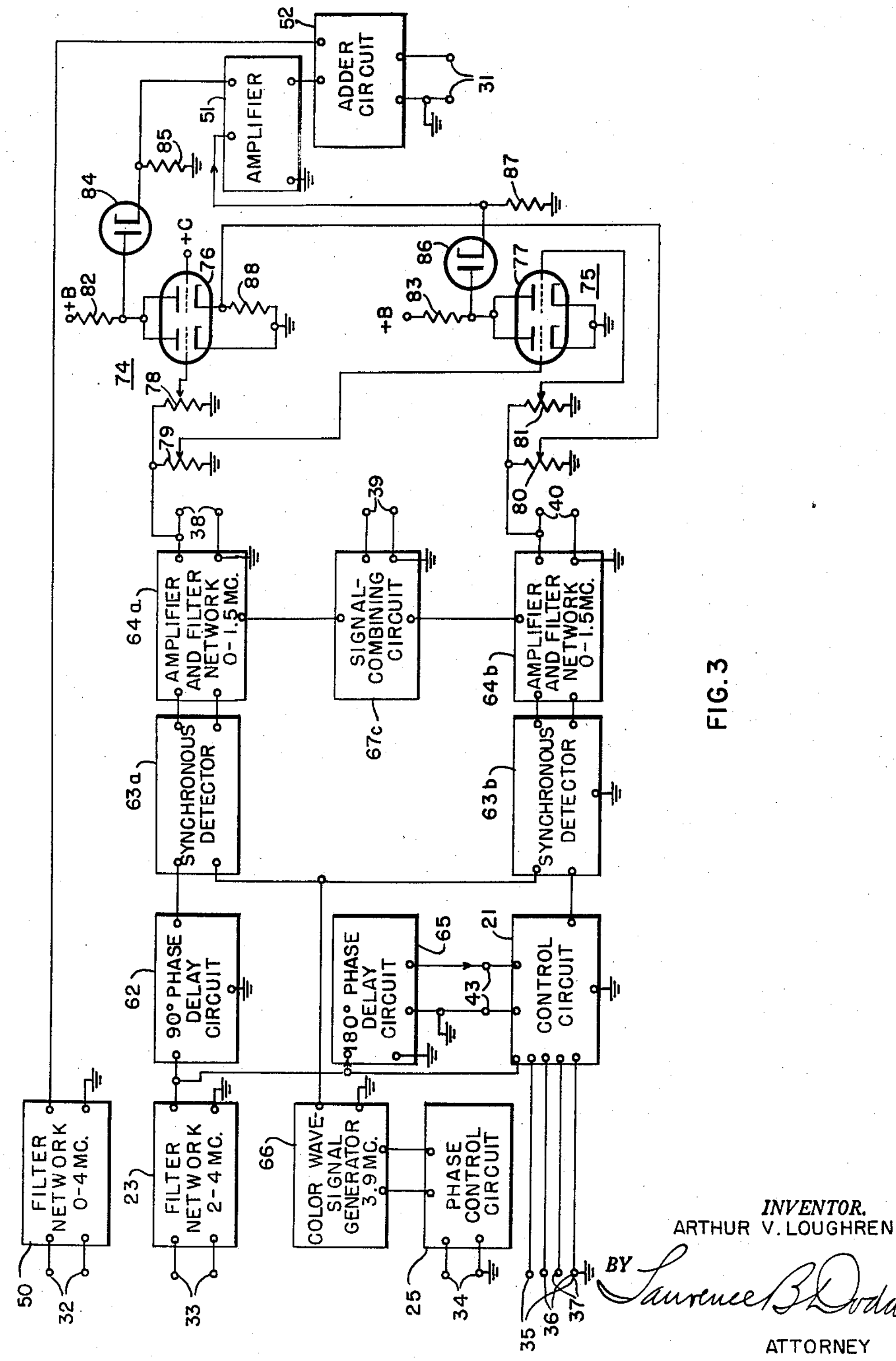
Fig. 3 is a circuit diagram, partly schematic, of a modified form of the signal-modifying system of Fig. 1.

*Description and explanation of operation of portion of signal-modifying system represented by Fig. 3*

The embodiments of Figs. 1 and 2 have been described as arrangements which utilize a subcarrier wave signal which has been properly developed at the transmitter for the purpose of effecting elimination of the cross-product terms of $p$ and $q$ at the receiver when obtaining the correction signal. It was stated with respect to the signal-modifying system 16 of Fig. 1 that the elimination of the cross-product terms of $p$ and $q$ may be effected by causing the quadrature-modulation components $p$ and $q$ to include well-defined portions of the color-difference signals at proper intensities and to occur at predetermined phase points of the subcarrier wave signal.

Thus, considering the elliptical luminance error locus of a conventional subcarrier wave signal such as defined in the aforementioned "Electronics" article, where the major and minor axes of the ellipse do not coincide with the axes of the vectors $p'$ and $q'$, it is desired to rotate the ellipse through an angle $\phi$ until the major and minor axes thereof do coincide with the $p'$ and $q'$ vectors and then to vary the relative intensity ranges of the vectors $p'$ and $q'$ so that the ellipse becomes a circle. Having effected this result there is obtained a modified subcarrier wave signal having a set of vectors $p$ and $q$ such that the luminance locus defined thereby is a circle centered on the axes of the vectors $p$ and $q$.

It is possible to include in the receiver circuits for utilizing the above-mentioned conventional subcarrier wave signal including $p'$ and $q'$ modulation components at 0° and 90° where $$p' = \frac{E_b^{1/\gamma} - E_y}{2.03}$$

and $$q' = \frac{E_r^{1/\gamma} - E_y}{1.14}$$

and, by controlling the intensities of the vectors $p'$ and $q'$ and by determining the angle $\phi$ through which such subcarrier modulation components should be rotated to be the equivalent of the subcarrier wave signal discussed with respect to Fig. 1, to utilize a circuit arrangement for effectively causing the components to be rotated through the angle $\phi$ and thus effectively to develop a subcarrier wave signal such as discussed with respect to Fig. 1. The portion of the signal-modifying system of Fig. 3 includes circuits for effecting the last-mentioned result. Since, except for the adder circuits, the components of Fig. 3 are similar to components of Fig. 1, corresponding components are identified by the same reference numerals. Additionally, the terminals identified in Fig. 3 correspond to the similarly numbered terminals in the signal-modifying system 16 of Fig. 1.

Before considering the description of the circuits in the embodiment of Fig. 3 to effect the result just considered, it will be helpful to determine the parameters of the angle $\phi$ through which a conventional modulated subcarrier wave signal should be rotated to cause the cross-product terms of the $p$ and $q$ modulation components to be zero. A conventional subcarrier wave signal $S_1$ having the in-phase and in-quadrature modulation components $p_1$, $q_1$ with respect to a predetermined reference angle $\omega t$ may be defined as follows:

$$S_1=p_1 \cos \omega t+q_1 \sin \omega t \qquad (24)$$

If expressed in terms of the coordinates upon a new axis rotated counterclockwise through the angle $\phi$, the subcarrier wave signal $S_1$ becomes a signal S defined as follows:

$$S=p \cos (\omega t-\phi)+q \sin (\omega t-\phi) \qquad (25)$$

The physical meaning of the rotation of the subcarrier to have new coördinates on a new axis is the rotation of the vectors $p'$ and $q'$ so the major and minor axes of the above-mentioned ellipse coincide with a new set of vectors $p$ and $q$. Such rotation may be obtained, for example, by the rotation of the locally developed color wave signal with respect to the predetermined phase relation between it and the modulated subcarrier wave signal. This phase change is expressed in terms of the angle $\phi$. From the geometric relationships of the terms in Equations 24 and 25 the following equations are obtained:

$$p_1=p \cos \phi-q \sin \phi \qquad (26)$$

$$q_1=p \sin \phi+q \cos \phi \qquad (27)$$

By replacing the terms $p_1$ and $q_1$ in Equation 24 by the equavilant terms as defined by Equations 26 and 27 and expanding the resultant signal in terms of a binomial series as performed in Fig. 1 to develop the second order term which represents both the error signal and the composition of the desired correction signal, it is found that the following equation defining $\phi$ is obtained:

$$\tan 2\phi=\frac{P}{T-U} \qquad (28)$$

or $$\phi=\frac{1}{2} \tan^{-1} \frac{P}{T-U} \qquad (29)$$

where the terms P, T, and U represent the multiplier coefficients of the terms $p^2$, $pq$, and $q^2$ in the expanded binomial equation. The definition of the terms P, T, and U may be obtained by reference to Equation 11 above. Though the mathematical operations are complex, a value for the term $\phi$ is determinable and may be utilized in the embodiment of Fig. 3 to develop the $p$ and $q$ components from the $p'$ and $q'$ modulation components of the subcarrier wave signal $S_1$. By utilizing the $p$ and $q$ components, the cross-product terms of $p$ and $q$ vanish and a square-law operation as previously described herein may be utilized to obtain a value for the error signal including the terms $p^2$ and $q^2$.

Since a conventional subcarrier wave signal is utilized in the embodiment of Fig. 3, the detector 63$b$ is coupled to the unit 64$b$ and no signal-combining unit for eliminating portions of the signal representative of blue from the channel translating the signal representative of red is required. In addition to the change just mentioned and to the units corresponding to units in the signal-modifying system of Fig. 1, the Fig. 3 embodiment includes a pair of signal-combining circuits 74 and 75 each including a duo triode vacuum tube, specifically, tubes 76 and 77, respectively, these tubes having control electrodes coupled to the output circuits of the units 64$a$ and 64$b$. One control electrode of the tube 76 is coupled through the tap of a potential divider 78 connected across the output circuit of the unit 64$a$ while one control electrode of the tube 77 is connected through the tap of another potential divider 79 connected in parallel with the divider 78. The other control electrode of the tube 76 is connected to a source of bias potential +C while the cathode thereof is connected through the tap of a potential divider 80 connected across the output circuit of the unit 64$b$. The cathode of the tube 76 is also connected through a load resistor 88 to ground. The other control electrode of the tube 77 is connected through the tap of a potential divider 81 connected in parallel with the divider 80. The adjustments of the variable taps on the voltage dividers 78–81, inclusive, are in accordance with the relationships expressed by Equations 16 and 17 above as will be explained more fully hereinafter. The other cathode of the tube 76 and the cathode of the tube 77 are connected to the negative terminal of a source +B while the anodes of thereof are connected through resistors 82 and 83, respectively, to the positive terminal of the same source.

The anode of the tube 76 is coupled through a diode 84, having a cathode load resistor 85, and the amplifier 51 to an input circuit of the adder circuit 52 while the anode of the tube 77 is connected through a similar diode 86, having a cathode load resistor 87, and the amplifier 51 to another input circuit of the adder circuit 52. The diodes 84 and 86 with their cathode load circuits 85 and 87 comprise a simple form of square-law repeater for developing in the output circuits thereof a signal which has an intensity which is the square of the signal applied to the anode circuits of the diodes. It should be understood that the polarity of the diodes 84 and 86 is dependent upon the polarity of the signal developed in the anode circuits of the tubes 76 and 77. The amplifier 51 has a gain factor of $1/Z$ as previously mentioned herein.

The signals developed in the output circuits of the networks 64$a$ and 64$b$ are $q_1$ and $p_1$, respectively, these being the in-phase and in-quadrature modulation components of a conventional subcarrier wave signal. Equations 26 and 27 define the relationships between the desired components $p$ and $q$ and the available components $p_1$ and $q_1$. A rearrangement of these equations, solving for the values of $p$ and $q$ in terms of the values $p_1$ and $q_1$ and the angle $\phi$, gives:

$$p=p_1\left(\frac{\cos 2\phi-\sin 2\phi}{\cos 2\phi}\right)+q_1 \frac{\sin \phi}{\cos 2\phi} \qquad (30)$$

$$q=q_1\left(\frac{1}{\cos \phi-\sin \phi \tan \phi}\right)-p_1\left(\frac{\tan \phi}{\cos \phi-\sin \phi \tan \phi}\right) \qquad (31)$$

Knowing the value for $\phi$ as defined by Equation 29, the Equations 30 and 31 are solvable and reducible to a form wherein the multipliers of the $p_1$ and $q_1$ terms in both Equations 30 and 31 become fractions. The voltage dividers 78–81, inclusive, are adjustable in terms of these fractions. Thus, considering the voltage dividers 78 and 81 and Equation 31, the voltage divider 78 is adjusted to the fraction represented by the multiplier of the term $q_1$ in Equation 31 while the voltage divider 81 is adjusted to the fraction represented by the multiplier of the term $p_1$ in Equation 31. Similarly, considering the voltage dividers 79 and 80 and Equation 30, the divider 79 is adjusted to correspond to the fractional multiplier of the term $q_1$ in Equation 30 while the voltage divider 80 is adjusted to represent the fractional multiplier of the term $p_1$ in Equation 30. The signal-combining circuit 74 effectively algebraically adds the terms of Equation 31 to develop a signal representative of $q$ in the anode circuit thereof while the signal-combining circuit 75 adds the terms of Equation 30 to develop a signal representative of $p$ in the anode circuit thereof. The square-law repeater circuits including the diodes 84 and 86 effectively develop a signal whose intensities are, respectively, the squares of the intensities of $q$ and $p$. The signals $p^2$ and $q^2$ are divided by the factor Z in the amplifier 51 to develop a correction signal essentially as defined by Equation 18 above. This correction signal is combined in the adder circuit 52 with the luminance signal translated through the unit 50.

*Description and explanation of operation of portion of signal-modifying system of Fig. 4*

There has been described with reference to Fig. 3 a signal-modifying system in which the $p_1$ and $q_1$ modulation components of a modulated subcarrier wave signal are effectively converted to $p$ and $q$ components in order that the cross product of the terms $p$ and $q$ in the correction signal for the second order luminance effects will vanish leaving only the $p^2$ and $q^2$ terms. It may be desirable to modify the subcarrier wave signal including its modulation components $p_1$ and $q_1$ to a subcarrier wave signal having the components $p$ and $q$ without the complexity of deriving the $p_1$ and $q_1$ terms and then modifying the latter terms. A signal-modifying system including the portion represented by Fig. 4 effectively converts a subcarrier wave signal having the components $p_1$ and $q_1$ to one having the components $p$ and $q$ and utilizes relatively few circuit components to effect this conversion. Since many of the units of Fig. 4 correspond to units of Figs. 1 and 2, such units are identified by the same reference numerals. The terminals identified in Fig. 4 correspond to the similarly numbered terminals in Fig. 1. For simplicity of explanation and reduction of the number of circuits, it is assumed with reference to Fig. 4 that a subcarrier wave signal continuously defined by Equation 24 is utilized.

The embodiment of Fig. 4 includes, in cascade, in the order named, and coupled to the output circuit of the generator 66, a second harmonic amplifier 89, a phase-modifying circuit 90, and a modulator 91 including a pentode 92. The output circuit of the amplifier 70 is coupled through a parasitic suppression resistor 93 to the inner control electrode of the tube 92. The outer control electrode of tube 92 is coupled through another parasitic suppression resistor 94 to the adjustable contact of a voltage divider 95 connected across the output circuit of the unit 90. The cathode of the tube 92 is connected through a resistor 96 to the common negative terminal of the screen electrode and anode potential sources. The screen grid is directly coupled to the positive terminal of the screen-grid potential source +Sc while the anode is connected to the positive terminal of the anode potential source +B through a winding 97 of a transformer 98. A secondary winding 99 of the transformer 98 is connected to the anode of a diode 100 and through a parallel circuit of a resistor 101 and a condenser 102 to the cathode of the diode 100. The junction of the winding 99 and the resistor 101 is connected to the common negative terminal of the system while the cathode is connected through the signal divider 72 to the adder circuit 52. The circuit including the transformer 98 is tuned to translate only signals having a frequency of approximately 3.9 megacycles.

It is the purpose of the units 89, 90, and 91 to convert a subcarrier wave signal such as defined by Equation 24 above to one such as defined by Equation 25 above so that the intensity of the latter subcarrier wave signal may be squared without causing a cross product of the terms $p$ and $q$ in the Equation 25 to be developed. In other words, a conventional subcarrier wave signal having an elliptical luminance locus is to be converted into a subcarrier wave signal as previously considered herein having a circular luminance locus. Such conversion requires a rearrangement of the modulation components of the wave signal in phase, composition, and intensity ranges. It can be shown that a modulator, if energized by a locally developed signal of proper intensity and phase and having twice the frequency of the modulated subcarrier wave signal, can be caused to heterodyne with the modulated subcarrier wave signal to develop in the output circuit of the modulator what is effectively a remolded subcarrier wave signal having a form such as defined in Equation 25. The second harmonic amplifier 89 effectively develops a second harmonic of the signal conventionally generated in the unit 66. This second harmonic signal is modified in phase by the unit 90 with reference to the reference phase of the signal conventionally developed in the generator 66 and by an amount which will be more fully considered hereinafter. Also, it is controlled in intensity by the voltage divider 95 and applied to the outer control electrode of the modulator including the tube 92. The modulated subcarrier wave signal defined by Equation 24 above is applied to the inner control electrode of the modulator 92. The modulator 92, in a manner to be described in the following paragraphs, causes the signals applied to the inner and outer electrodes thereof to heterodyne to develop in the circuit including the diode 100 a modified subcarrier wave signal such as defined by Equation 25.

The modulation process $m$ of a modulator, in other words, the transmittance, that is, the ratio of the output current to the applied signal voltage, can be expressed as a function of the amplitude and phase of the second harmonic signal applied to the outer control electrode of the tube 92 as well as a function of the inherent signal-translating characteristic of the modulator with no second harmonic signal applied thereto. Thus:

$$m=f(1+d\cos 2\omega t+h\sin 2\omega t) \quad (32)$$

where the coefficients $d$ and $h$ represent, respectively, the in-phase and the quadrature-phase modulation depths required at the second harmonic frequency. The Equation 32 also inherently includes a factor which defines the required intensity or gain control of the modulator 92 by the second harmonic signal as will become more apparent hereinafter.

The signal developed in the output circuit of the tube 92 is a function of the product of the signal defined by Equation 24 and the modulation process defined by Equation 32. This signal may be expressed in terms of the current flowing in the anode circuit of the tube 92. Ignoring the higher frequency terms, since these terms are not translated through the transformer 98, this current $i$ is defined as follows:

$$i=f\left[\left(p_1\left[1+\frac{d}{2}\right]+q_1\frac{h}{2}\right)\cos\omega t+\left(q_1\left[1+\frac{h}{2}\right]-p_1\frac{d}{2}\right)\sin\omega t\right] \quad (33)$$

If the current $i$ passes through a load impedance $R_a$ which is the transfer impedance of the anode load circuit of the tube 92 and the rectifier including the diode 100 looking from the tube 92 through the diode 100, and only frequencies much lower than $$\frac{\omega}{2\pi}$$

are considered, the potential $e_0$ developed in the output circuit of the square-law rectifier including the diode 100 may be defined as:

$$e_0=i^2R_a \quad (34)$$

The value for $i^2$ determinable from Equation 33 can be substituted in Equation 34 to provide an expression related to the error signal $E_s$. Such equation, after proper grouping of the terms, is:

$$e_0=R_a\frac{f^2}{2}\left[p_1^2\left(1+d+\frac{d^2}{2}\right)+p_1q_1(h-d)+q_1^2\left(1+h+\frac{h^2}{2}\right)\right] \quad (35)$$

If the potential $e_0$ is to equal the error signal $E_s$, then the coefficients of $p_1^2$, $p_1q_1$, and $q_1^2$ in Equation 35 should equal, respectively, the terms T, P, and U as defined with respect to Equations 28 and 29. The in-phase and quadrature-phase modulation depths $d$ and $h$, respectively, become solvable in terms of the known variables in Equation 11 representing the terms T, P, and U and thus representing terms in Equation 35 including $d$ and $h$. The coefficient $$R_a\frac{f^2}{2}$$

of Equation 35 represents the proper gain for the modulator 91. If the modulator 91 has such gain and the second harmonic signal applied to the outer control electrode thereof is controlled in intensity and phase in accordance with the terms $d$ and $h$, there is developed in the output circuit of the square-law detector including the diode 100 a signal including only $p^2$ and $q^2$ terms and no cross-product terms. This is operated on in the unit 72 as previously described herein with reference to Fig. 2, to give a correction signal such as defined by Equation 18.

*Description and explanation of operation of signal-modifying system of Fig. 5*

The modulation operation described with reference to Fig. 4 assumed a subcarrier wave signal continuously defined by Equation 24 whereas, if the sequences of the components $p_1$ and $q_1$ are changed at least once during every field of the reproduced image, the modulated subcarrier wave may not continuously be defined by Equation 24 but may be defined by such equation only during one group of fields and by another equation of a similar type during another group of fields intervening the first fields. In view of such changing in the sequences of the modulation components, one set of predetermined parameters for controlling the intensity and phase of the second harmonic signal and the gain of the modulator 91 of Fig. 4 will be inadequate for converting the different modulated subcarrier wave signals. Consequently, it may be desirable to have a dual set of phase-modifying circuits, modulators, and square-law detectors, one set of which is utilized during one group of fields and another set of which is utilized during the intervening group of fields. The signal-modifying system of Fig. 5 includes such dual sets of units. Since the components of the system of Fig. 5 correspond to components of Fig. 1 and Fig. 4, the same units are designated by the same reference numerals. Wherever there are dual units of similar type, these units are represented by suffixes "*a*" and "*b*" added to the reference numerals of the unit.

With respect to Fig. 5, two channels individually including, in cascade, in the order named, units **90*a*, 91*a*, and 100*a* for one channel and units 90*b*, 91*b*, and 100*b* for the other channel are coupled to separate circuits of a switch circuit 104 having input circuits coupled to the control circuit 21 and to the second harmonic amplifier 89. The output circuits of the units 100*a* and 100*b* are connected to input circuits of the signal divider 72, an input circuit of which is also connected to the output circuit of the network 50**.

The operation of the units **90*a*, 91*a*, and 100*a* and the units 90*b*, 91*b*, and 100*b* is similar to the operation of the corresponding units explained with reference to Fig. 4. However, only one set of such units is in operation during any one field of scan. The switch circuit 104 under the control of the control circuit 21 connects the output circuit of the second harmonic amplifier 89 to one channel, for example, the channel including the units 90*a*, 91*a*, and 100*a* during one field of scan and to the other channel, for example, the channel including the units 90*b*, 91*b*, and 100*b* during the other field of scan. The parameters of the different channels are proportioned in accordance with the composition of the modulated subcarrier wave signal applied to the units 91*a* and 91*b*** on the different fields of scan to develop the desired correction signal as described with reference to Fig. 4.

There have been described herein embodiments of signal-modifying systems for utilization in constant luminance receivers to effect corrections of the second and higher order luminance effects in such receivers. It should be understood that the invention is by no means limited to the embodiments described. Even if the luminance and chromaticity signals such as considered herein are not transmitted or developed in the receiver, it is possible that with luminance and chromaticity signals of other compositions that a signal-modifying system in accordance with the teaching of the invention may provide useful correction of luminance errors and effectively replace a bothersome luminance error with less bothersome colorimetric errors. Though such modification of the luminance and chromaticity signals may alter the color and luminance of the image, such may be preferable to undesired luminance flicker caused by signals in the color channels. Generally considered, the invention is directed to a signal-modifying system which includes a nonlinear circuit coupled to the channel through which the subcarrier wave signal is translated for deriving from the subcarrier wave signal correction signals representative of the luminance effects developed by the modulation components of such subcarrier wave signal in a nonlinear image-reproducing device.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means including a nonlinear signal-modifying apparatus including a repeater having substantially a square-law signal-translating chracteristic coupled to said second circuit and effectively responsive to at least said modulation components of said second signal for effectively squaring the intensity of said components to develop a correction signal substantially representative of the difference between the luminance of an image reproduced by the device from said first and second signals and the luminance represented by said first signal; and means comprising a signal-translating system including an adder circuit coupled to said first circuit and said apparatus and responsive to said first and correction signals for developing therefrom a composite first signal, said signal-translating system being responsive to said second signal for applying said composite first and said second signals to the device to cause the luminance of an image reproduced thereby substantially to correspond to said luminance represented by said first signal.

2. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus effectively responsive to at least said modulation components of said second signal for developing therefrom a correction signal substantially representative of the difference between the luminance of an image reproduced by the device from said first and second signals and the luminance represented by said first signal; and means comprising a signal-translating system responsive to said first, second, and correction signals for applying said last-mentioned signals to the device to cause the luminance of an image reproduced thereby substantially to correspond to said luminance represented by said first signal.

3. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus coupled to said second circuit and effectively responsive to at least said modulation components of said second signal for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

4. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus effectively responsive to the intensity of said second signal for developing therefrom a correction signal substantially representative of the difference between the luminance of an image reproduced by the device from said first and second signals and the luminance represented by said first signal; and means comprising a signal-translating system responsive to said first, second, and correction signals for applying said last-mentioned signals to the device to cause the luminance of an image reproduced thereby substantially to correspond to said luminance represented by said first signal.

5. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus including a repeater having substantially a square-law signal-translating characteristic effectively responsive to at least said modulation components of said second signal for effectively squaring the intensity of said components to develop a correction signal substantially representative of the difference between the luminance of an image reproduced by the device from said first and second signals and the luminance represented by said first signal; and means comprising a signal-translating system responsive to said first, second, and correction signals for applying said last-mentioned signals to the device to cause the luminance of an image reproduced thereby substantially to correspond to said luminance represented by said first signal.

6. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus coupled to said second circuit including a modulator having a pair of input circuits each effectively responsive to said second signal for effectively squaring the intensity of said second signal to develop therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

7. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus coupled to said second circuit and including a diode having a square-law signal-translating characteristic and effectively responsive to at least said modulation components of said second signal for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

8. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus including a first nonlinear repeater coupled to said second circuit and effectively responsive to said second signal for developing therefrom a third signal and including a second nonlinear repeater responsive to said third signal for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

9. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus coupled to said first and said second circuits and effectively responsive jointly to said first and said second signals for developing therefrom a correction signal substantially representative of the difference between the luminance of an image reproduced by the device from said first and second signals and the luminance represented by said first signal; and means comprising a signal-translating system responsive to said first, second, and correction signals for applying said last-mentioned signals to the device to cause the luminance of an image reproduced thereby substantially to correspond to said luminance represented by said first signal.

10. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus including a signal divider coupled to said first and said second circuits and effectively responsive to said first and said second signals for dividing said second signal by a component of said first signal to develop a resultant signal and for developing from said resultant signal a correction signal substantially representative of the difference between the luminance of an image reproduced by the device from said first and second signals and the luminance represented by said first signal; and means comprising a signal-translating system responsive to said first, second, and correction signals for applying said last-mentioned signals to the device to cause the luminance of an image reproduced thereby substantially to correspond to said luminance represented by said first signal.

11. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image and including detectors for deriving said components; means comprising a nonlinear signal-modifying apparatus coupled to said detectors and effectively responsive to at least said derived modulation components for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

12. A signal-modifying system for a color-television receiver including a color image-reproducting device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having a pair of modulation components primarily representative of the chromaticity of said color image and including a pair of detectors individually for deriving different ones of said components; means comprising a nonlinear signal-modifying apparatus including a pair of signal-combining devices coupled to said detectors for developing a pair of signals from said derived components and including a nonlinear repeater coupled to said signal-combining devices for developing from said pair of signals a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

13. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having a pair of modulation components primarily representative of the chromaticity of said color image and including a pair of detectors individually for deriving different ones of said components; means comprising a nonlinear signal-modifying apparatus including a pair of signal-combining devices having input circuits including voltage dividers coupled to said detectors for combining in each of said devices different proportions of said derived components to develop a pair of signals therefrom and including a nonlinear repeater coupled to said signal-combining devices for developing from said pair of signals a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

14. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a modulated subcarrier wave signal having modulation components primarily representative of the chromaticity of said color image and including a signal generator for developing a periodic signal the frequency of which substantially corresponds to the frequency of said subcarrier wave signal; means comprising a nonlinear signal-modifying apparatus including an amplifier coupled to said generator for developing a high-frequency signal having a frequency higher than that of said subcarrier wave signal and including a modulator coupled to said amplifier and to said second circuit and responsive jointly to said high-frequency signal and said second signal for developing therefrom a second subcarrier wave signal, said apparatus including a nonlinear repeater responsive to said second subcarrier wave signal for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, subcarrier, and correction signals for applying said last-mentioned signals to the device to cause the luminance of an image reproduced thereby substantially to correspond to said luminance represented by said first signal.

15. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a modulated subcarrier wave signal having modulation components primarily representative of the chromaticity of said color image and including a signal generator for developing a periodic signal the frequency of which substantially corresponds to the frequency of said subcarrier wave signal; means comprising a nonlinear signal-modifying apparatus including a second harmonic amplifier coupled to said generator for developing a second harmonic signal having twice the frequency of said subcarrier wave signal and including a modulator coupled to said amplifier and to said second circuit and responsive jointly to said second harmonic signal and said second signal for developing therefrom a second subcarrier wave signal, said apparatus including a nonlinear repeater responsive to said second subcarrier wave signal for developing therefrom a correction signal substantially representative of the difference between the luminance of an image reproduced by the device from said first and second signals and the luminance represented by said first signal; and means comprising a signal-translating system coupled to said first and said second circuits and said apparatus and responsive to said first, subcarrier, and correction signals for applying said last-mentioned signals to the device to cause the luminance of an image reproduced thereby substantially to correspond to said luminance represented by said first signal.

16. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image and including a detection system for deriving said modulation components in one sequence during one group of periods and in another sequence during an intervening group of periods; means comprising a nonlinear signal-modifying apparatus including a modulator system having a pair of signal-translating channels and including a switching circuit coupled between said channels and said second circuit for applying said second signal to one of said channels during said one group of periods and to the other of said channels during said intervening group of periods for developing from said second signal a correction signal substantially representative of the difference between the luminance of an image reproduced by the device from said first and second signals and the luminance represented by said first signal; and means comprising a signal-translating system coupled to said first and said second circuits and said apparatus and responsive to said first, second, and correction signals for applying said last-mentioned signals to the device to cause the luminance of an image reproduced thereby substantially to correspond to said luminance represented by said first signal.

17. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit for supplying a first signal primarily representative of the luminance of a color image and including a second circuit for supplying a second signal having modulation components primarily representative of the chromaticity of said color image; means comprising a nonlinear signal-modifying apparatus coupled to said second circuit and effectively responsive to at least said modulation components of said second signal for developing therefrom a correction signal substantially representative of the difference between the luminance of an image reproduced by the device from said first and second signals and the luminance represented by said first signal; and means comprising a signal-translating system including an adder circuit coupled to said first circuit and said apparatus and responsive to said first and correction signals for developing therefrom a composite first signal, said signal-translating system being responsive to said second signal for applying said composite first and said second signals to the device to cause the luminance of an image reproduced thereby substantially to correspond to said luminance represented by said first signal.

18. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit having a pass band of predetermined width for supplying a wide band first signal primarily representative of the luminance of a color image and including a second circuit having a pass band of width narrower than said predetermined width for supplying a narrow band second signal having modulation components primarily representative of the chromaticity of said color image; means comprising a nonlinear signal-modifying apparatus including a signal divider coupled to said first and said second circuits and effectively responsive to said first and said second signals for dividing said second signal by a component of said first signal to develop a resultant signal and for developing from said resultant signal a correction signal substantially representative of the difference between the luminance of an image reproduced by the device from said first and second signals and the luminance represented by said first signal; and means comprising a signal-translating system responsive to said first, second, and correction signals and having a pass band of width of the order of said predetermined width for applying said last-mentioned signals to the device to cause the luminance of an image reproduced thereby substantially to correspond to said luminance represented by said first signal.

19. A signal-modifying system for a color-television receiver including a color image-reproducing device having a nonlinear signal-translating characteristic tending to cause the luminance of an image reproduced by the device to differ from the luminance represented by a luminance signal applied thereto comprising: means including a first circuit having a pass band of width of the order of 4 megacycles for supplying a wide band first signal primarily representative of the luminance of a color image and including a second circuit having a pass band of width of the order of 2 megacycles for supplying a narrow band second signal having modulation components primarily representative of the chromaticity of said color image; means comprising a nonlinear signal-modifying apparatus including a signal divider coupled to said first and said second circuits and effectively responsive to said first and said second signals for dividing said second signal by a component of said first signal to develop a resultant signal and for developing from said resultant signal a correction signal substantially representative of the difference between the luminance of an image reproduced by the device from said first and second signals and the luminance represented by said first signal; and means comprising a signal-translating system responsive to said first, second, and correction signals and having a pass band of width of the order of that of said first circuit for applying said last-mentioned signals to the device to cause the luminance of an image reproduced thereby substantially to correspond to said luminance represented by said first signal.

20. A signal-modifying system for color-television apparatus which is a part of a color-television system in which nonlinear signal-reproducing apparatus is utilized comprising: means including a first circuit for supplying a first signal primarily representative of the luminance of a televised scene and a second circuit for supplying at least a second signal representative of the chromaticity of said televised scene; and means including a nonlinear signal-translating device responsive to said second signal and having a nonlinearity proportioned in relation to that of said signal-reproducing apparatus for developing from said second signal a luminance correction signal the amplitude of which is nonlinearly related to that of said second signal for combination with said first and second signals to compensate for high-order luminance effects developed by said second signal in the nonlinear signal-reproducing apparatus.

21. A signal-modifying system for color-television apparatus which is a part of a color-television system in which nonlinear signal-reproducing apparatus is utilized comprising: means including a first circuit for supplying a first signal primarily representative of the luminance of a televised scene and a second circuit for supplying at least a second signal representative of the chromaticity of said televised scene; and means including a square-law signal-translating device responsive to said second signal for developing therefrom a luminance correction signal the amplitude of which is substantially the second power of that of said second signal for combination with said first and second signals to compensate for high-order luminance effects developed by said second signal in the nonlinear signal-reproducing apparatus.

No references cited.